(No Model.)

A. E. OUTERBRIDGE, Jr.
CHEMICAL FLASK.

No. 514,426. Patented Feb. 6, 1894.

Attest

Inventor
Alexander E. Outerbridge, Jr.
By his atty

THE NATIONAL LITHOGRAPHING COMPANY,
WASHINGTON, D. C.

UNITED STATES PATENT OFFICE.

ALEXANDER E. OUTERBRIDGE, JR., OF PHILADELPHIA, PENNSYLVANIA, ASSIGNOR TO THE QUEEN & COMPANY, OF SAME PLACE.

CHEMICAL-FLASK.

SPECIFICATION forming part of Letters Patent No. 514,426, dated February 6, 1894.

Application filed March 1, 1893. Serial No. 464,186. (No model.)

*To all whom it may concern:*

Be it known that I, ALEXANDER E. OUTERBRIDGE, Jr., of the city and county of Philadelphia and State of Pennsylvania, have invented an Improvement in Chemical-Flasks, of which the following is a specification.

My invention has reference to chemical flasks and consists of certain improvements which are fully set forth in the following specification and shown in the accompanying drawings which form a part thereof.

Heretofore chemical flasks have been formed of glass ware or vitreous material such as porcelain and exceedingly thin as to thickness, and have never been protected against fracture due to water or drafts of air striking the lower portion thereof and which are brought into direct contact with the flask. In the laboratory fracturing of these delicate flasks of glass ware, in which the materials such as liquids are being subjected to heat, is frequent, and is due mainly to the unprotected condition of the glass or porcelain which may come into direct contact with the flame or hot air or heated body on the one side, and in contact with the fluid or contents on the other side.

The object of my invention is to overcome this defect in chemical glassware; and in carrying out my invention I coat the lower portion of the thin delicate glass or porcelain flask with an exceedingly thin layer of electro deposited metal, preferably copper owing to its high conductivity. It is preferable that the copper coating shall extend sufficiently high upon the flask or vessel so as to clasp the glass firmly within its embrace and thereby prevent the possibility of the metallic coating being inadvertently displaced from the glass.

My invention will be better understood by reference to the accompanying drawings, in which—

Figure 1:
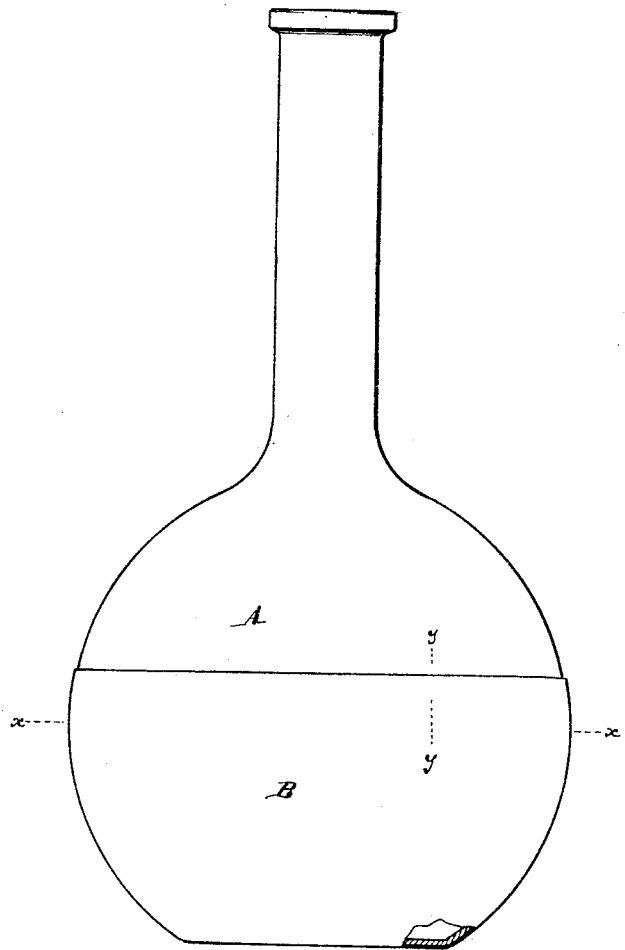
Figure 2:
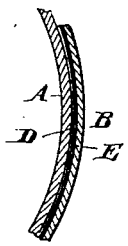

Figure 1 is an elevation of a chemical flask embodying my invention, and Fig. 2 is a cross section on line $y$—$y$ thereof.

A is the glass or porcelain flask proper and is formed of exceedingly thin glass, preferably highly annealed. The shape of this flask is immaterial and may be that of any chemical flask in use in laboratories and now upon the market.

B is a metallic coating secured in close position about the lower portion of the flask. It is preferably of copper but may be of any other metal.

In preparing the flask, so much thereof as is to be coated, is covered with a thin paste indicated at D, and upon this is deposited plumbago E, and the flask is then submerged in the plating bath in the manner customary for plating articles. A metal coating B is thus deposited upon the plumbago surface. After the vessel is removed from the bath, the outer surface is polished, and if desired, nickel or silver plated for finish. It will be observed that in this manner the entire bottom C and lower portions of the side of the flask are completely and perfectly covered with a thin layer of copper which directly receives the flame and drafts of air and thoroughly protects the portion of the flask which is in direct contact with the liquid. Furthermore, the upper part of the flask is entirely unobstructed by the metallic casing B so that the contents may be clearly observed during the subjection to heat. In this manner, the advantages of the clear glass flask are maintained in conjunction with those of the metallic covering. It will be also observed that the metallic coating B is extended some distance above the line of greatest diameter $x$—$x$ so that the metal actually clamps itself upon the glass body of the flask, and thus is permanently and positively secured in place and not liable under any handling to be displaced or accidently removed.

My invention may be adapted to all kinds of vessels in which evaporation is carried on and even to large stills such as may be used in the manufacture of sulphuric acid.

The illustration forming part of this application is given as an example of my improvement in chemical or laboratory flasks, but as above stated, the shapes will vary very materially according to the purposes for which the flasks are to be used, and I therefore do not limit myself to the shape herein illustrated.

What I claim as new, and desire to secure by Letters Patent, is—

1. As a new article of manufacture a chemical flask or vessel of thin glassware or vitreous material having its bottom and lower outer surface coated with an exceedingly thin continuous layer of electrically deposited copper, and having its upper part unobstructed by any covering.

2. As a new article of manufacture, a chemical flask or vessel consisting of a bulb shaped body of vitreous material having an electrically deposited coating of metal entirely covering its bottom and lower portion and extended up to a short distance above the largest diameter and having the upper portion unobstructed to the sight.

In testimony of which invention I have hereunto set my hand.

ALEX. E. OUTERBRIDGE, JR.

Witnesses:
R. M. HUNTER,
HELEN L. MOTHERWELL.